United States Patent
Taniguchi et al.

(10) Patent No.: US 6,459,978 B2
(45) Date of Patent: Oct. 1, 2002

(54) METHOD AND APPARATUS TO CONTROL CONTINUOUSLY VARIABLE TRANSMISSION OF MOTOR VEHICLE

(75) Inventors: Hiroji Taniguchi, Okazaki (JP); Katsumi Kono, Toyota (JP); Kenji Matsuo, Toyota (JP); Hideki Yasue, Toyota (JP); Tadashi Tamura, Aichi-ken (JP); Daisuke Inoue, Toyota (JP); Yoshiaki Yamamoto, Toyota (JP); Hiroki Kondo, Toyota (JP); Yuji Hattori, Bisai (JP); Syoichi Sayo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/853,573

(22) Filed: May 14, 2001

(30) Foreign Application Priority Data

May 23, 2000 (JP) ........................................ 2000-151301

(51) Int. Cl.[7] ............................ F16H 55/56; F16H 37/08
(52) U.S. Cl. ........................ 701/51; 475/116; 475/127; 475/212; 474/11; 474/28; 477/39; 477/48
(58) Field of Search ............................ 701/51; 475/210, 475/127, 116, 211, 212, 208, 320, 321; 474/28, 11; 477/45, 39, 48

(56) References Cited

U.S. PATENT DOCUMENTS 5,057,061 A * 10/1991 Sakakibara et al. ......... 475/210
5,298,000 A * 3/1994 Rattunde et al. .............. 474/24
5,720,691 A * 2/1998 Ogawa et al. ................. 477/45
6,030,313 A * 2/2000 Sawada et al. ................ 477/46
6,188,946 B1 * 2/2001 Suzuki et al. ................. 701/62

FOREIGN PATENT DOCUMENTS

| JP | A 03-204462 | 9/1991 |
| JP | A 04-365645 | 12/1992 |
| JP | A 06-156121 | 6/1994 |
| JP | 406156121 A * | 6/1994 |
| JP | A 11-044359 | 2/1999 |

* cited by examiner

Primary Examiner—William A. Cuchlinski, Jr.
Assistant Examiner—Tuan C To
(74) Attorney, Agent, or Firm—Oliff & Berridge, PLC (57) ABSTRACT

A method and apparatus for controlling a continuously variable transmission of a motor vehicle includes a controller that controls the speed ratio of the continuously variable transmission in accordance with a predetermined shift condition. The method and apparatus perform shift control in a specific manner during an operation of an anti-lock brake system, for example, by smoothing at least one of the rotational speed of the input shaft and the rotational speed of the output shaft, reducing a rate of change in the speed ratio during down shifting, restricting upshifting of the CVT, increasing an amount of hydraulic oil delivered from an oil pump, and/or increasing belt clamping force.

27 Claims, 9 Drawing Sheets

FIG. 10

METHOD AND APPARATUS TO CONTROL CONTINUOUSLY VARIABLE TRANSMISSION OF MOTOR VEHICLE

INCORPORATION BY REFERENCE

The disclosure of Japanese Patent Application No. 2000-151301 filed on May 23, 2000, including the specification, drawings and abstract, is incorporated herein by reference in its entirety.

BACKGROUND OF THE INVENTION

1. Field of Invention

The invention relates to a method and apparatus to control a continuously variable transmission of a motor vehicle, and more particularly to the control of the continuously variable transmission during an operation of an anti-lock brake system.

2. Description of Related Art

Motor vehicles having a continuously variable transmission (CVT), a shift control device, and an anti-lock brake system (ABS) are known. The continuously variable transmission is disposed in a power transmission path between a drive power source for running the vehicle and drive wheels. This type of transmission is capable of continuously varying the speed ratio (i.e., input-shaft rotational speed/output-shaft rotational speed), which is the ratio of the speed of rotation of an input shaft on the power source side to the speed of rotation of an output shaft on the drive wheel side. The above-indicated shift control device is operable to control the speed ratio of the continuously variable transmission in accordance with predetermined shift conditions. The anti-lock brake system (ABS) is operable to control the braking force so as to avoid locking of the drive wheels during braking. An example of such vehicles is disclosed in Japanese laid-open Patent Publication No. 6-156121. In the vehicle disclosed in this publication, the shift control is performed during the operation of the ABS, based on an estimated vehicle body speed, instead of the vehicle speed that corresponds to the wheel speed, or the speed of rotation of the output shaft, so that a vehicle operator or driver is less likely to feel bumping of the vehicle (or shift shocks) that would be caused by fluctuations in the speed ratio of the continuously variable transmission due to changes in the wheel speed caused by the ABS.

However, since the estimated vehicle body speed is calculated by the ABS, the number of communication lines between the ABS and the control apparatus of the CVT is increased, and the control apparatus, which employs a CPU, or the like, having the function of communicating with the ABS, tends to be complicated and be available at an increased cost.

Even though the above arrangement can reduce or suppress fluctuations in the speed ratio of the continuously variable transmission during the operation of the ABS, there is still a problem of slipping of a belt of the belt-and-pulley type CVT in which the power is transmitted by use of frictional force. More specifically, as the speed of rotation of the output shaft (or wheel speed) changes, the inertia torque of a power source for running the vehicle acts on the continuously variable transmission, thus causing slipping of the transmission belt of the CVT. In view of this problems, it has been proposed, for example in Japanese laid-open Patent Publication No. 11-44359, to increase a belt clamping force or pressure for an increase in the frictional force between the belt and pulleys in order to prevent the afore- mentioned belt slippage. However, in the known continuously variable transmission in which shift control and clamping force control are performed by using hydraulic oil, sufficiently large belt clamping force may not be generated when the hydraulic oil is consumed for a shifting operation of the continuously variable transmission. In the case where a mechanical oil pump driven by the power source for running the vehicle is used to generate a hydraulic pressure, for example, if the speed of rotation of the pump and the amount of oil delivered from the pump are reduced with a reduction in the vehicle speed, a sufficiently large amount of the hydraulic oil and sufficiently large belt clamping force may not be provided. In order to avoid such shortage of the hydraulic oil, it may be considerable to reduce the rate of change in the speed ratio of the continuously variable transmission. In this case, however, the speed ratio may not be returned to a predetermined ratio at which the vehicle is to be stopped, which ratio is normally equal to the maximum speed ratio, before the vehicle stops.

SUMMARY OF THE INVENTION

It is therefore an object of the invention to provide a method and an apparatus for controlling a continuously variable transmission, which reduces fluctuations in the speed ratio of the transmission during an operation of an ABS, thereby to avoid bumping of the vehicle, without using an estimated vehicle body speed, while further reliably avoiding slipping of a transmission belt due to variations in the inertia torque during the operation of the ABS.

To accomplish the above and/or other objects, one aspect of the invention provides a method and an apparatus for controlling a continuously variable transmission of a motor vehicle that is provided in a power transmission path between a power source that runs the vehicle and at least one drive wheel, in which a speed ratio of the transmission, which is a ratio of a rotational speed of an input shaft on the side of the power source to a rotational speed of an output shaft on the side of the drive wheel(s), can be continuously varied. The method and apparatus include a controller that: (a) controls the speed ratio of the continuously variable transmission in accordance with a predetermined shift condition, and (b) smoothes at least one of the rotational speed of the input shaft and the rotational speed of the output shaft for use in control of the speed ratio, during an operation of an anti-lock brake system for controlling braking force to prevent the drive wheel from locking during a braking operation.

In the method and apparatus constructed as described above, fluctuations in the speed ratio of the continuously variable transmission due to increases and decreases in the output-shaft rotational speed during the operation of the ABS are suppressed or reduced, so that the vehicle is less likely to suffer from bumping (shift shocks) due to the changes in the speed ratio. Furthermore, since at least one of the input-shaft speed NIN and the output-shaft speed NOUT are smoothed for the shift control, the control apparatus can be easily constructed at a reduced cost, as compared with the case where shift control is performed based on an estimated vehicle body speed that is determined by the ABS, or the like.

BRIEF DESCRIPTION OF THE DRAWINGS

The foregoing and/or further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

A preferred embodiment of the invention will be hereinafter described with reference to the accompanying drawings.

Figure 1:
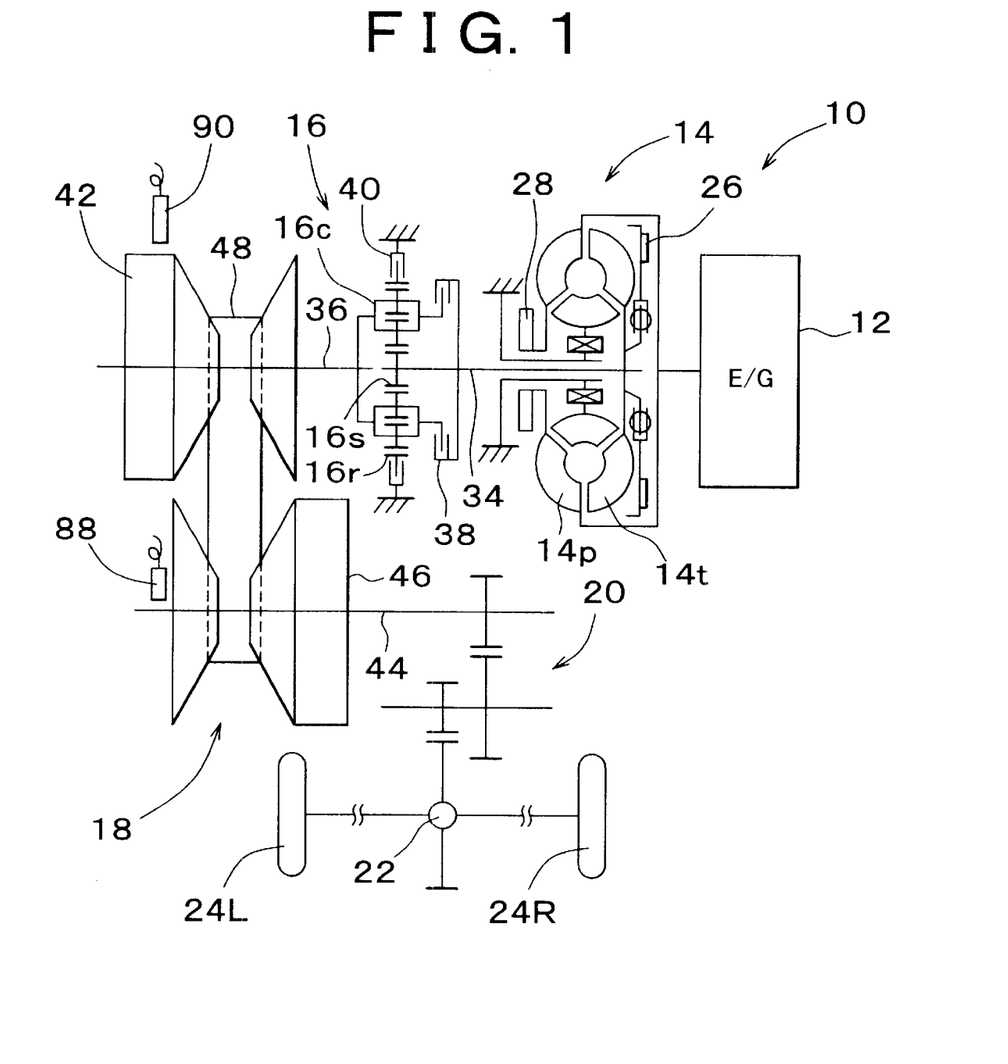
FIG. 1 is a schematic diagram of a vehicular drive apparatus to which the invention is applied.

FIG. 1 is a schematic diagram showing a vehicular drive apparatus 10 to which the invention is applied. The vehicular drive apparatus 10 is of the transversely-mounted type, and is suitably employed in FF (front-engine and front-drive) type vehicles. The vehicular drive apparatus 10 has an internal combustion engine 12 that is used as a power source for running the vehicle. The output of the engine 12 is transmitted to a differential gear set 22 via a torque converter 14, a forward/reverse-drive switching device 16, a belt-type continuously variable transmission (CVT) 18, and a speed reducing gear train 20, and then distributed to right-hand and left-hand side drive wheels 24R 24L.

The torque converter 14 has a pump impeller 14p connected to a crankshaft of the engine 12, and a turbine runner 14t connected to the forward/reverse-drive switching device 16 via a turbine shaft 34. The torque converter 14 utilizes a fluid for transmitting power from the engine 12 to the switching device 16. A lockup clutch 26 is provided between the pump impeller 14p and the turbine runner 14t, and is capable of coupling the impeller 14p directly with the turbine 14t so that the impeller 14p and the turbine 14t can rotate together as a unit. The pump impeller 14p is provided with a mechanical oil pump 28 that generates hydraulic pressures for controlling the speed ratio of the continuously variable transmission 18, for producing belt clamping force for clamping or gripping a transmission belt 48 of the transmission 18, and for supplying a lubricant to various portions of the apparatus 10.

The forward/reverse-drive switching device 16 generally consists of a double-pinion-type planetary gear set or device.

The switching device 16 includes a sun gear 16s to which the turbine shaft 34 of the torque converter 14 is connected, a carrier 16c to which an input shaft 36 of the continuously variable transmission 18 is connected, and a ring gear 16r. When a clutch 38 disposed between the carrier 16c and the sun gear 16s is engaged, the forward/reverse-drive switching device 16 is rotated as a unit with the turbine shaft 34 being directly coupled with the input shaft 36, so that forward driving force is transmitted to the drive wheels 24R, 24L. When a brake 40 disposed between the ring gear 16r and a housing is engaged and the clutch 38 is released, the input shaft 36 is rotated in a direction opposite to the rotating direction of the turbine shaft 34, so that reverse driving force is transmitted to the drive wheels 24R, 24L to run the vehicle in a reverse direction.

Figure 2:
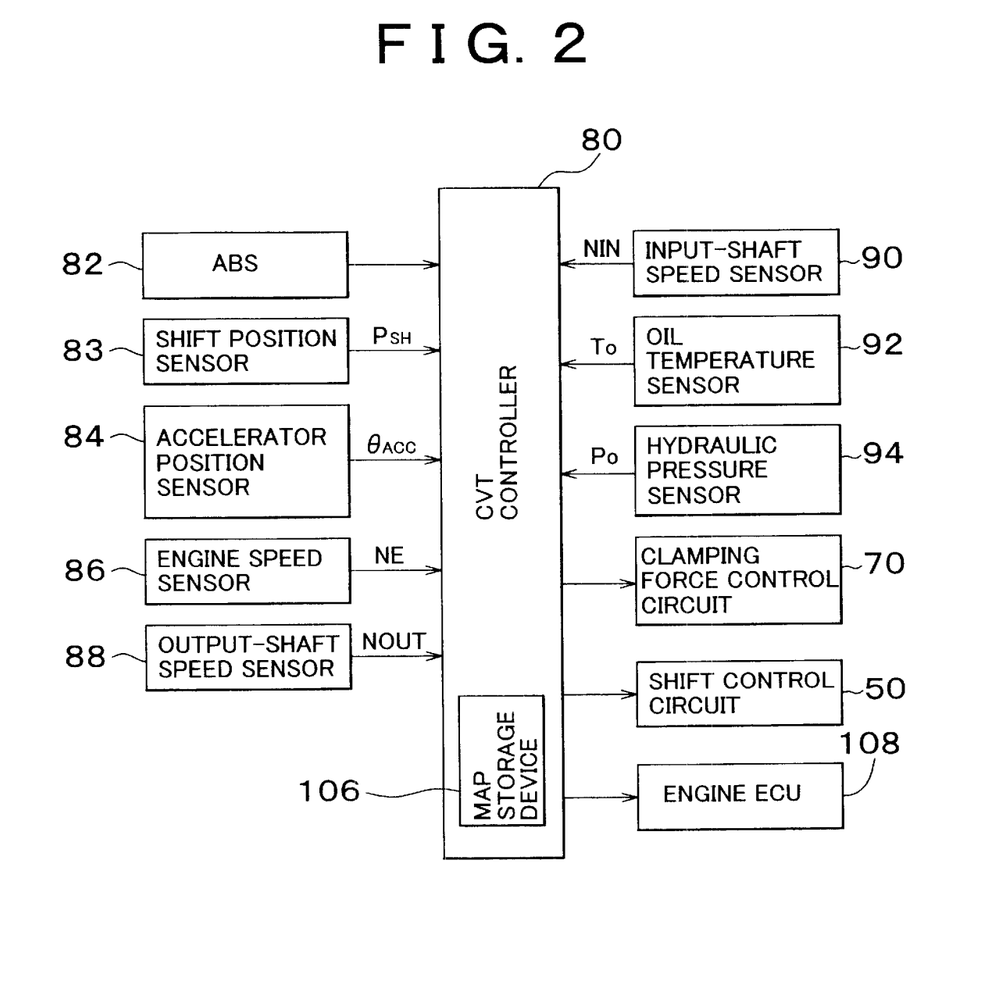
FIG. 2 is a block diagram showing a control system of a continuously variable transmission in the vehicular drive apparatus of FIG. 1.

The continuously variable transmission 18 has an input-side variable pulley 42 which is provided on the input shaft 36 and whose effective diameter is variable, an output-side variable pulley 46 which is provided on an output shaft 44 and whose effective diameter is variable, and a transmission belt 48 that is wound around the variable pulleys 42, 46. In the continuously variable transmission 18, power is transmitted by utilizing friction between the transmission belt 48 and the variable pulleys 42, 46. Each variable pulley 42, 46 has a V-shaped groove whose width is variable, and is provided with a hydraulic cylinder. A shift control circuit 50 as shown in FIG. 2 is provided for controlling the hydraulic pressure in the hydraulic cylinder of the input-side variable pulley 42, thereby to change the V-groove width of each variable pulley 42, 46 and change the diameter (effective diameter) of each pulley at which the transmission belt engages with the pulley. With this arrangement, the speed ratio γ (i.e., the speed of rotation of the input shaft NIN/the speed of rotation of the output shaft NOUT) can be continuously varied.

Figure 4:
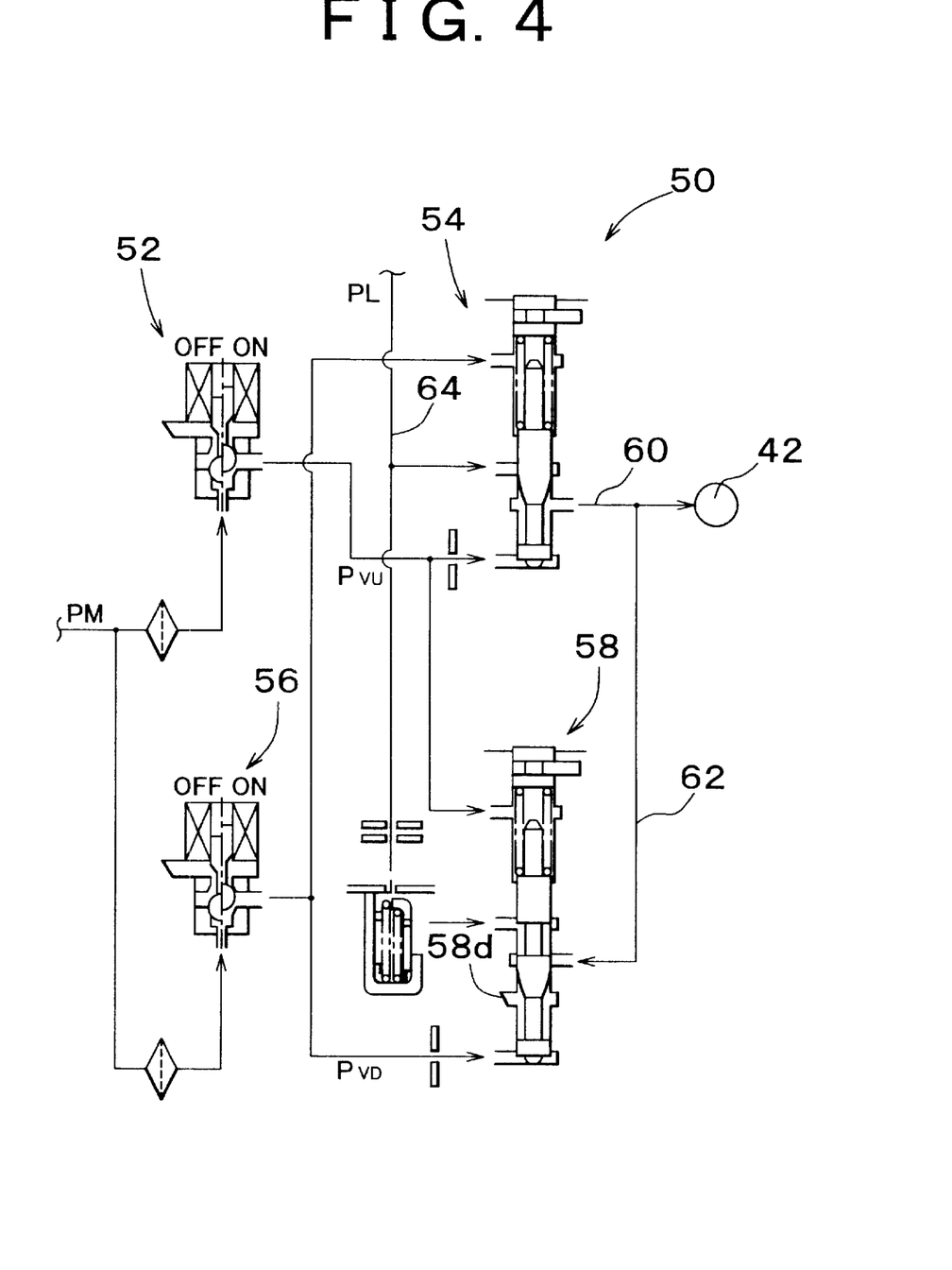
FIG. 4 is a circuit diagram illustrating an example of a shift control circuit in the control system of FIG. 2.

FIG. 4 shows an example of the shift control circuit 50. The shift control circuit 50 has a solenoid valve 52 and a flow control valve 54 for upshifts in which the speed ratio γ is reduced, and a solenoid valve 56 and a flow control valve 58 for downshifts in which the speed ratio γ is increased. When a CVT controller 80 as shown in FIG. 2 controls the upshift solenoid valve 52 of the shift control circuit 50 with a controlled duty ratio, the solenoid valve 52 reduces a modulator pressure PM to a suitable control pressure $P_{VU}$, and generates the control pressure $P_{VU}$ to the flow control valve 54. Then, a line pressure PL that has been regulated in accordance with the control pressure $P_{VU}$ in the flow control valve 54 is supplied via a supply passage 60 to the hydraulic cylinder of the input-side variable pulley 42, so that the V-groove width of the input-side variable pulley 42 is reduced, and the speed ratio γ is reduced. When the CVT controller 80 controls the downshift solenoid valve 56 with a controlled duty ratio, the solenoid valve 56 reduces the modulator pressure PM to a suitable control pressure $P_{VD}$, and generates the control pressure $P_{VD}$ to the flow control valve 58. As a result, a drain port 58d is opened in accordance with the control pressure $P_{VD}$, so that hydraulic oil is drained at a certain flow rate from the input-side variable pulley 42 through a discharge passage 62. As a result, the V-groove width is increased, and the speed ratio γ is increased. Even when the speed ratio γ is almost constant, and no hydraulic oil needs to be supplied to the input-side variable pulley 42, the flow control valve 54 communicates a line oil passage 64 with the supply passage 60 with a predetermined flow cross-sectional area, so that a suitable hydraulic pressure is applied to the variable pulley 42 in order to prevent the speed ratio from changing due to oil leakage.

Figure 5:
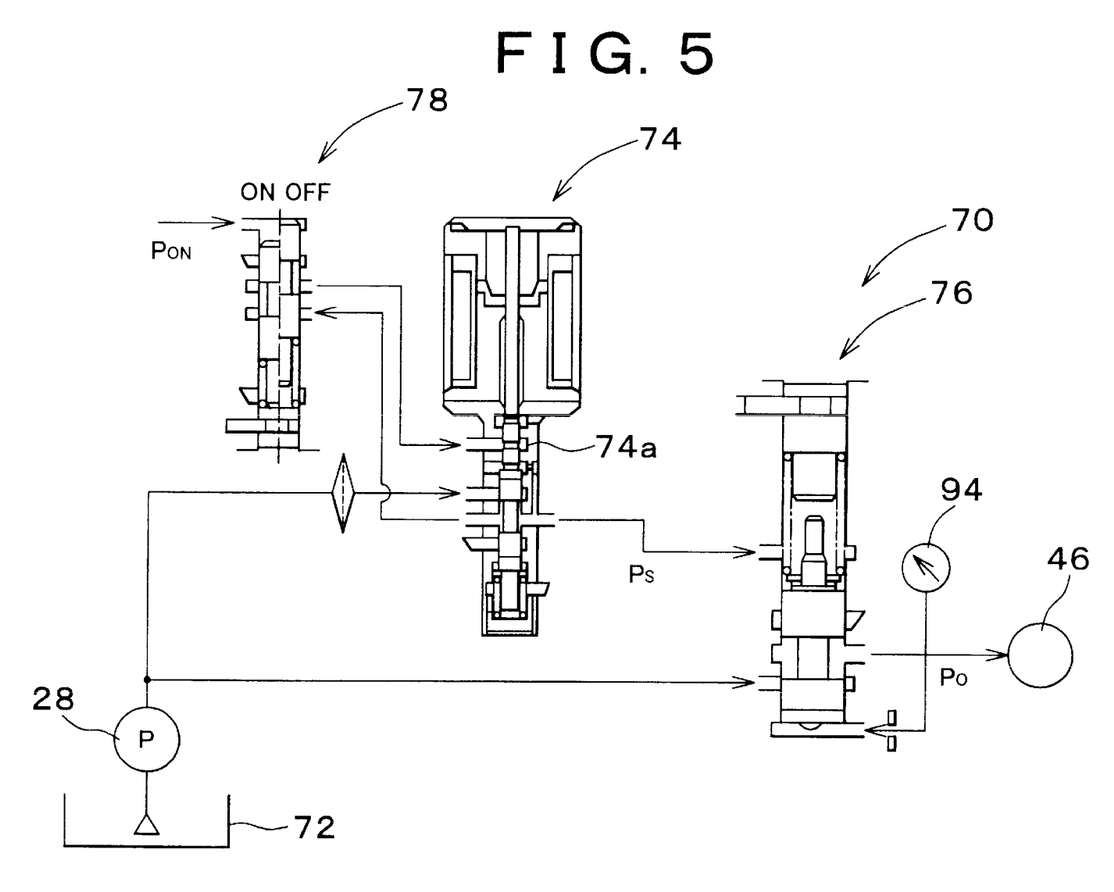
FIG. 5 is a circuit diagram illustrating an example of a belt clamping force control circuit in the control system of FIG. 2.

The hydraulic pressure in the hydraulic cylinder of the output-side variable pulley 46 is regulated under control of a clamping force control circuit 70 as shown in FIG. 5 so that the transmission belt 48 will not slip. FIG. 5 shows an example of the clamping force control circuit 70. A hydraulic oil that is pumped from an oil tank 72 by the oil pump 28 is supplied to a linear solenoid valve 74, and is also supplied to the hydraulic cylinder of the output-side variable pulley 46 via a clamping force control valve 76. When the CVT controller 80 continuously controls current that energizes the linear solenoid valve 74, the linear solenoid valve 74 continuously regulates the pressure of hydraulic oil supplied from the oil pump 28, and generates a resulting control pressure $P_S$ to the clamping force control valve 76. As the control pressure $P_S$ increases, a hydraulic pressure $P_O$ of hydraulic oil that is supplied from the clamping force control valve 76 to the hydraulic cylinder of the output-side variable pulley 46 increases in accordance with the control pressure $P_S$, so as to increase the belt clamping force, i.e., the frictional force between the transmission belt 48 and the variable pulleys 42, 46.

The above-described clamping force control circuit 70 further includes a cutback valve 78. When the cutback valve 78 is ON, the control pressure $P_S$ is supplied to a feedback chamber 74a of the solenoid valve 74. When the cutback valve 78 is OFF, the supply of the control pressure $P_S$ is discontinued, and the feedback chamber 74a is exposed to the atmosphere. In this manner, the control pressure $P_S$, and consequently the hydraulic pressure $P_O$, is switched to a lower level (i.e., is reduced or cut back) when the cutback valve 78 is ON, as compared with the case where the cutback valve 78 is OFF. The cutback valve 78 is switched ON in response to a signal pressure $P_{ON}$ supplied from a solenoid valve (not shown) when the lockup clutch 26 of the torque converter 14 is ON (engaged).

The CVT controller 80 shown in FIG. 2 includes a microcomputer. By processing signals in accordance with programs pre-stored in a ROM while utilizing the temporary storage function of a RAM, the CVT controller 80 performs shift control and clamping force control on the continuously variable transmission 18. The CVT controller 80 receives, from an ABS (anti-lock brake system) 82, information as to whether the ABS 82 is in operation. The CVT controller 80 is also supplied with signals indicating a shift position $P_{SH}$ of a shift lever, an amount of operation of an accelerator pedal $\theta_{ACC}$, an engine speed NE, a speed NOUT (corresponding to the vehicle speed V) of rotation of the output shaft 44, a speed NIN of rotation of the input shaft 36, an oil temperature $T_O$ of the hydraulic circuit, a hydraulic pressure $P_O$ of the output-side variable pulley 46, etc., which are respectively received from a shift position sensor 83, an accelerator position sensor 84, an engine speed sensor 86, an output-shaft speed sensor 88, an input-shaft speed sensor 90, an oil temperature sensor 92, a hydraulic pressure sensor 94, etc.

When a brake fluid pressure is generated by depression of a brake pedal so that braking force is applied to wheels including the drive wheels 24R, 24L, the ABS 82 detects the speed of rotation of each wheel and determines whether the wheel is slipping. If any of the wheels are slipping, the ABS 82 forcibly reduces a brake fluid pressure applied to the wheel so as to prevent the wheel from locking. Thus, the ABS 82 increases and reduces the brake fluid pressure in a controlled manner so as to realize highest-possible braking performance. A vehicle driver or operator is adapted to manipulate the shift lever so as to select one of a plurality of shift positions $P_{SH}$, which include a D range for forward drive, an R range for reverse drive, an N range for cutting off power transmission, and a P range for parking, for example. When the shift lever is operated to the D range, the brake 40 of the forward/reverse-drive switching device 16 is disengaged or released and the clutch 38 of the device 16 is engaged. When the shift lever is operated to the R range, the clutch 38 is released and the brake 40 is engaged. When the shift lever is operated to the N range or the P range, both the clutch 38 and the brake 40 are released, so that power transmission is cut off or disconnected. When the P range is selected, rotation of the drive wheels 24R, 24L is mechanically inhibited by a mechanical parking lock mechanism.

Figure 3:
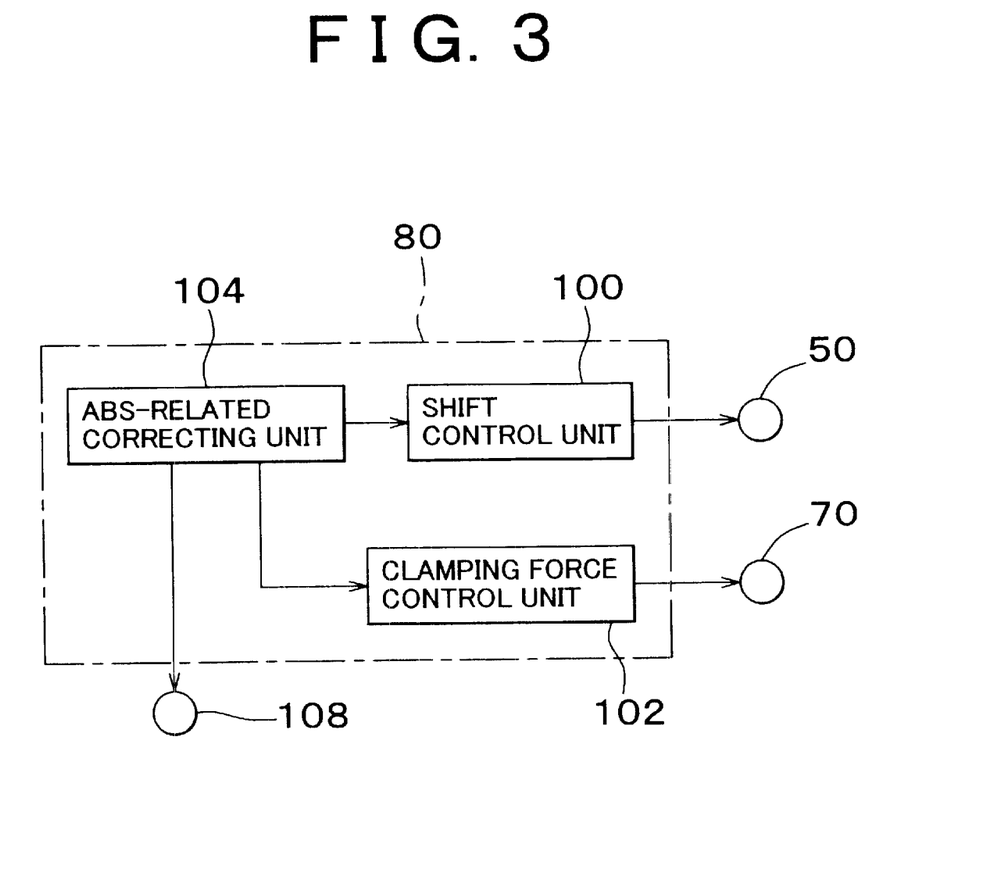
FIG. 3 is a block diagram showing the functions of a CVT controller as shown in FIG. 2.
Figure 7:
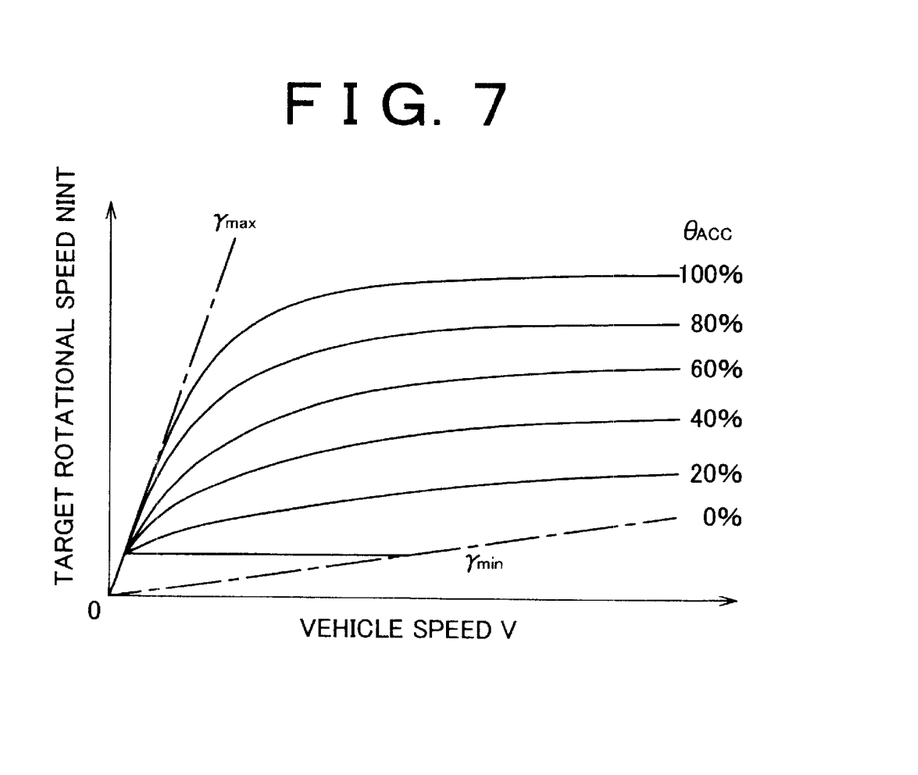
FIG. 7 is a graph indicating an example of a shift map that is used to determine a target rotational speed NINT during shift control performed by a shift control unit shown in FIG. 3.

As shown in FIG. 3, the CVT controller 80 functionally includes a shift control unit 100, a clamping force control unit 102, and an ABS-related correcting unit 104. The shift control unit 100 calculates a target input-side (input-shaft) rotational speed NINT with reference to a shift map that is predetermined by using, as parameters, the accelerator operating amount $\theta_{ACC}$ indicating an output required by the vehicle operator or driver, and the vehicle speed V (corresponding to the speed NOUT of the output shaft 44) as indicated in FIG. 7. In accordance with a deviation of an actual input-shaft speed NIN from the target input-shaft speed NINT, the shift control unit 100 controls the speed ratio of the continuously variable transmission 18 so that the actual input-shaft speed NIN becomes equal to the target input-shaft speed NINT. More specifically, by feedback-controlling the solenoid valves 52, 56 of the shift control circuit 50, the shift control unit 100 controls the supply and discharge of hydraulic oil to and from the hydraulic cylinder of the input-side variable pulley 42. As is understood from the map of FIG. 7 that represent shift conditions, the target input-shaft speed NINT is set so as to provide a larger speed ratio $\gamma$ as the vehicle speed V is lower and the accelerator operating amount $\theta_{ACC}$ is larger. Furthermore, since the vehicle speed V corresponds to the output-shaft rotational speed NOUT, the target speed NINT, which is a target value of the speed of rotation NIN of the input shaft, corresponds to a target speed ratio, which is determined within a range between a minimum speed ratio $\gamma_{min}$ and a maximum speed ratio $\gamma_{max}$ of the continuously variable transmission 18. The aforementioned shift map is pre-stored in a map storage device (ROM or the like) 106 of the CVT controller 80. In this embodiment, the shift control unit 100 and the shift control circuit 50 provide a shift control device according to the invention.

Figure 6:
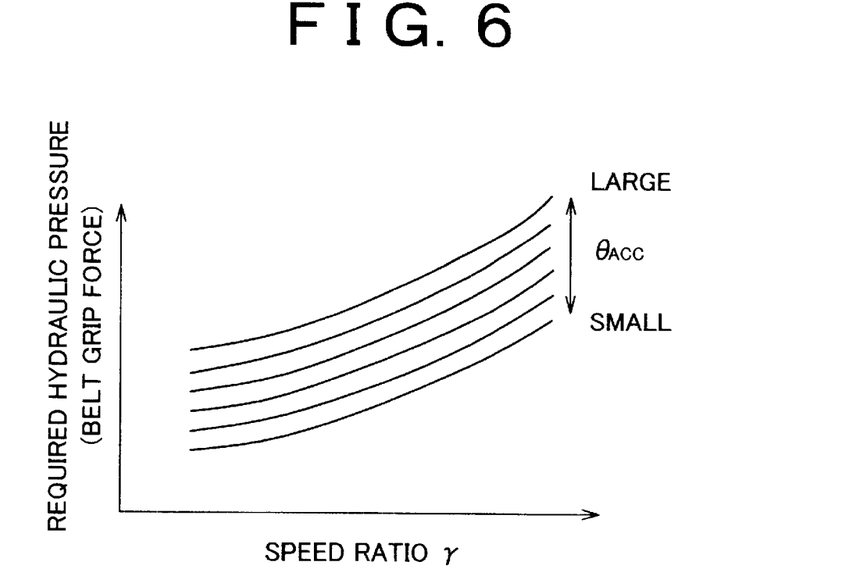
FIG. 6 is a graph indicating an example of a required hydraulic pressure map that is used to determine a required hydraulic pressure during belt clamping force control performed by a clamping force control unit shown in FIG. 3.

The clamping force control unit 102 controls the belt clamping force of the continuously variable transmission 18, more specifically, regulates the hydraulic pressure $P_O$ in the hydraulic cylinder of the output-side variable pulley 46, by controlling current for energizing the solenoid valve 74 of the clamping force control circuit 70 in accordance with a predetermined map as shown in FIG. 6. This map indicates a required hydraulic pressure (corresponding to required belt clamping pressure) that is predetermined by using, as parameters, the speed ratio $\gamma$ and the accelerator operating amount $\theta_{ACC}$ corresponding to the transferred torque, so that the transmission belt will not slip. The required hydraulic pressure, or the required belt clamping pressure $P_B$, is basically represented by an expression (1) below, using input torque $T_{IN}$, a friction coefficient $\mu$, a belt engagement diameter R of the input-side variable pulley 42, and a pulley area A. The input torque $T_{IN}$ and the belt engagement diameter R correspond to the accelerator operating amount $\theta_{ACC}$ and the speed ratio $\gamma$, respectively. The required hydraulic pressure map as indicated in FIG. 6 is determined based on the expression (1). In the expression (1), $\alpha$ is a constant that is determined in view of a safety factor that involves a control error, or the like, and is equal to a value greater than 1.0. The required hydraulic pressure map as indicated in FIG. 6 represents clamping force control conditions, and is pre-stored in the map storage device 106 of the CVT controller 80 as in the case of the shift map. Instead of the accelerator operating amount $\theta_{ACC}$, the throttle opening or the torque of the engine 12 may be used. In this embodiment, the clamping force control unit 102 and the clamping force control circuit 70 provide the clamping force device according to the invention.

$$P_B=(T_{IN}/\mu \cdot R \cdot A) \times \alpha \qquad (1)$$

During the operation of the ABS 82, the ABS-related correcting unit 104 corrects the shift control performed by the shift control unit 100, the belt clamping force control performed by the clamping force control unit 102, and an engine output control performed by an engine ECU (electronic control unit) 108. More specifically, the ABS-related correcting unit 104 performs signal processing in accordance with a flowchart shown in FIG. 8.

Figure 8:
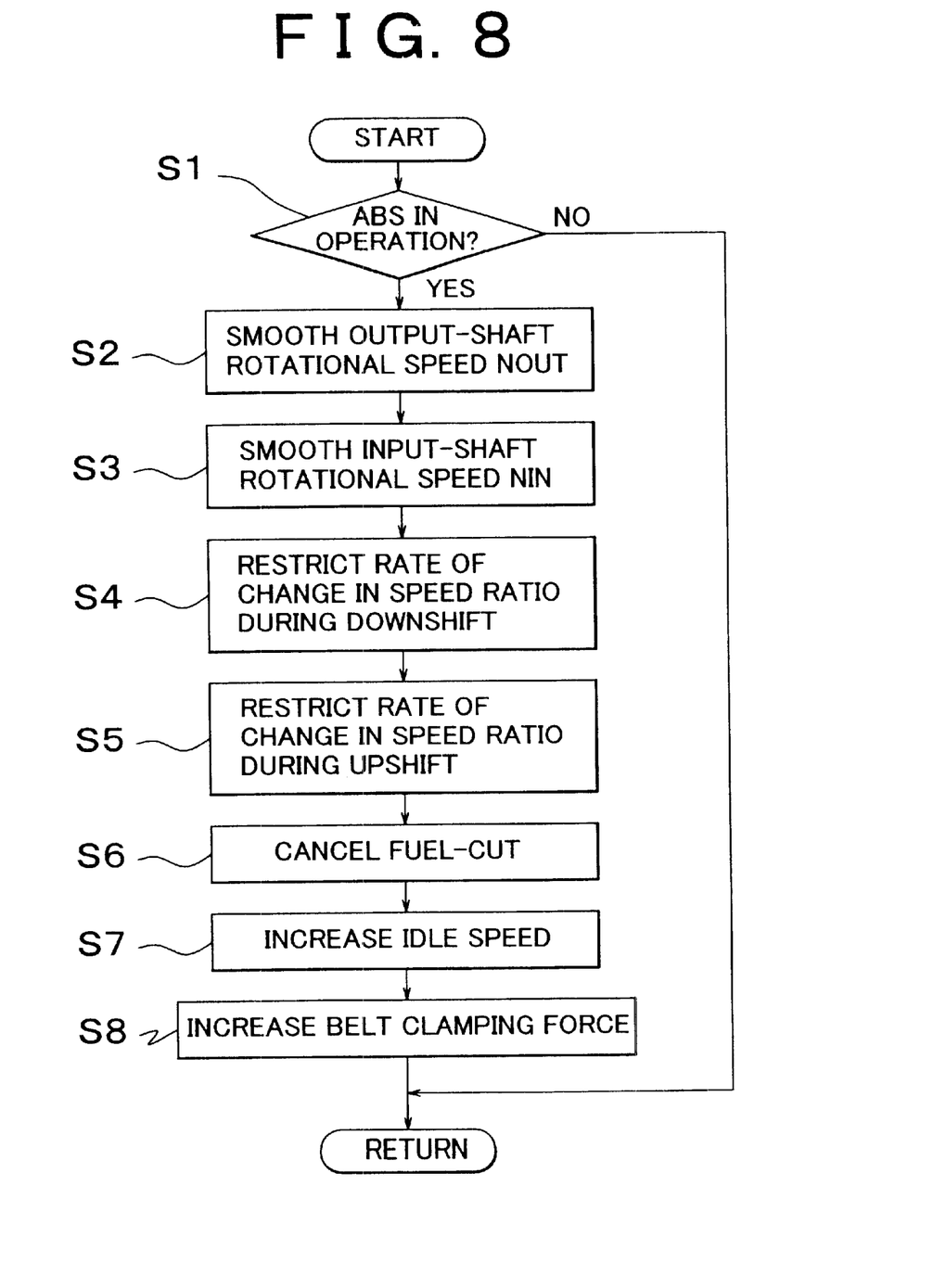
FIG. 8 is a flowchart illustrating the content of signal processing performed by an ABS-related correcting unit shown in FIG. 3.

The flowchart of FIG. 8 is executed cyclically at predetermined time intervals. In step S1, it is determined whether the ABS 82 is operating, namely, whether a wheel is in a certain slipping state and control for increasing or decreasing the hydraulic brake pressure is being performed, based on information received from the ABS 82. If the ABS 82 is not in operation ("NO" is obtained in step S1), the routine immediately ends. If the ABS 82 is operating ("YES" is obtained in step S1), the process proceeds to step S2 and subsequent steps. In step S2, a process of smoothing the output-shaft rotational speed NOUT received from the output-shaft speed sensor 88 is performed. In step S3, a process of smoothing the input-shaft rotational speed NIN received from the input shaft speed sensor 90 is performed. For example, the smoothing process may be performed by calculating a moving average of the input-shaft or output-shaft speed over a fixed or predetermined interval of time or over a fixed number of samples. Thus, the smoothing process is performed by obtaining moving averages of the output values of the input-shaft and output-shaft speed sensors 88, 90, so as to reduce fluctuations in the output values of these speed sensors. The shift control unit 100 performs shift control by using the smoothed output-shaft speed and the smoothed input-shaft speed. This arrangement reduces or suppresses fluctuations (hunting) in the speed ratio γ of the continuously variable transmission 18, which would otherwise be caused by increases and decreases of the output-shaft rotational speed NOUT during the operation of the ABS 82. Consequently, the continuously variable transmission 18 is able to change the speed ratio with improved stability.

Figure 9:
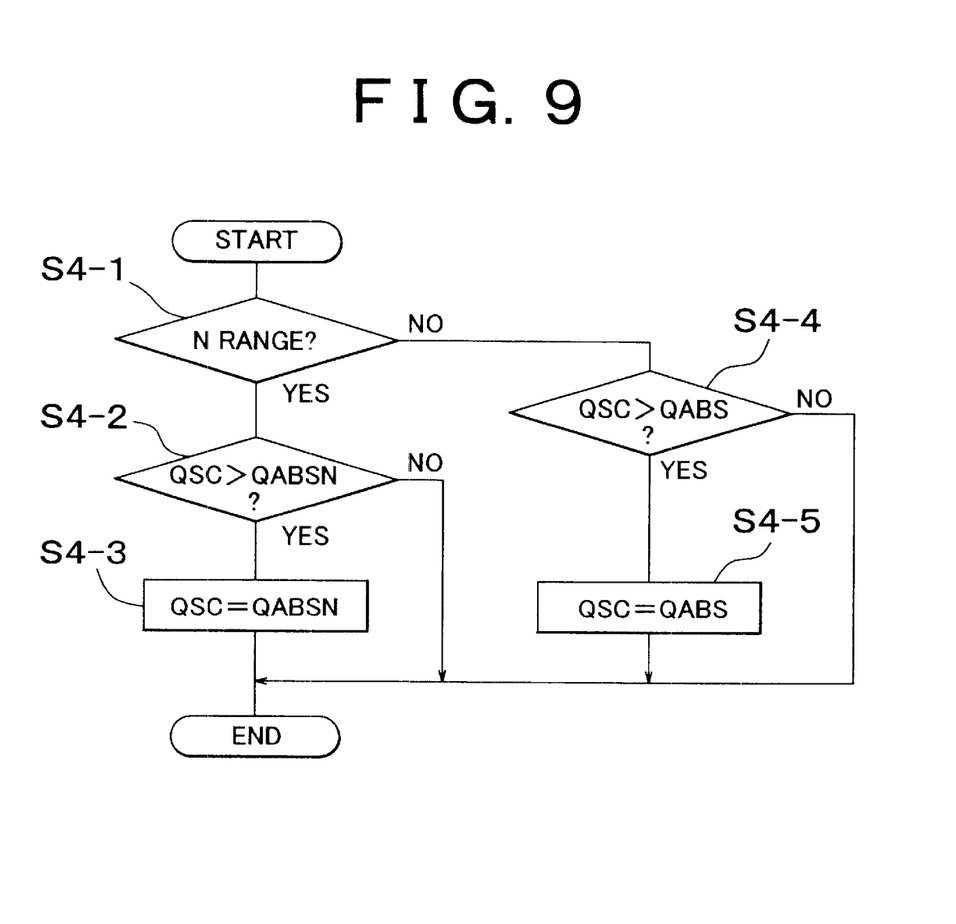
FIG. 9 is a flowchart further illustrating the content of the restricting step of S4 in FIG. 8.

In step S4, the rate of change in the speed ratio γ in a downshift direction, namely, in such a direction as to increase the speed ratio γ, is restricted according to a flowchart as shown in FIG. 9, so as to suppress or reduce fluctuation (hunting) in the speed ratio γ of the continuously variable transmission 18, which would otherwise be caused by increases and decreases of the output-shaft speed NOUT during the operation of the ABS 82. When hydraulic oil is drained from the input-side variable pulley 42 via the discharge passage 62 and the flow control valve 58 during a downshift operation, hydraulic oil is also drained from the line oil passage 64 connected to the supply passage 60 via the flow control valve 54, whereby an increased amount of hydraulic oil tends to be consumed. In this embodiment, however, the degree of opening, of the flow control valve 58, in other words, the rate of change in the speed ratio during downshifting, is restricted as described above, so that the amount of consumption of hydraulic oil in the line oil passage 64 is reduced, thus assuring a sufficiently high hydraulic pressure to be applied to the input-side variable pulley 42.

In step S4-1 of FIG. 9, it is determined whether the shift position $P_{SH}$ detected by the shift position sensor 83 is the N range. If the shift position $P_{SH}$ is the N range, the process proceeds to step S4-2. If the shift position $P_{SH}$ is not the N range, the process proceeds to step S4-4. In step S4-2, it is determined whether the duty ratio QSC of the downshift solenoid valve 56 controlled by the shift control unit 100 is greater than a predetermined upper limit value QABSN. If QSC>QABSN, an upper guard is provided by controlling the duty ratio QSC to be equal to QSABSN in step S4-3. If QSC≦QABSN, the routine of FIG. 9 immediately ends. The duty ratio QSC is determined in accordance with a difference between the target rotational speed NINT and the actual input shaft rotational speed NIN, by using a predetermined arithmetic expression of feedback control. The duty ratio QSC is a physical quantity that corresponds to the degree of opening of the flow control valve 58, namely, the rate of change of the speed ratio during downshifting. While the shift position is the N range, the transmission path is disconnected, and the inertia of the engine 12, the torque converter 14, or the like, does not affect the operation of the continuously variable transmission 18. Therefore, when the shift position is the N range, the upper limit value QABSN is set to 100%, so that downshift is quickly accomplished without any substantial restriction.

Conversely, if the shift position $P_{SH}$ is not the N range, more specifically, if the shift position $P_{SH}$ is the D range or the R range, it is determined in step S4-4 whether the duty ratio QSC of the solenoid valve 56 is greater than a predetermined upper limit value QABS. If QSC>QABS, an upper guard is provided by controlling the duty ratio QSC to be equal to QABS in step S4-5. If QSC≦QABS, the routine immediately ends. When the shift position $P_{SH}$, is the D range or the R range, the power transmission path is connected, and the inertia of the engine 12, the torque converter 14, or the like, affects the operation of the continuously variable transmission 18. Therefore, the upper limit value QABS is set to a suitable value, for example, 60%, so that no belt slippage and no shift shock will occur due to the inertia during shifting of the transmission 18. Thus, the duty ratio QSC, which is equivalent to the rate of change in the speed ratio, is limited. If the upper limit value QABS is excessively small, the speed ratio γ cannot be returned to a predetermined vehicle-stop speed ratio (which is normally equal to the maximum speed ratio $\gamma_{max}$) by the time the vehicle stops. Therefore, the upper limit value QABS is set to a value that is as large as possible within a range in which belt slippage due to a reduced hydraulic pressure can be prevented.

Referring back to FIG. 8, the control process proceeds to step S5 in which the rate of change in the speed ratio γ in an upshift direction, that is, in such a direction as to decrease the speed ratio γ, is restricted. While the output-shaft rotational speed NOUT is increased or decreased during the operation of the ABS 82, a conventional CVT could be shifted up upon an increase in the output-shaft rotational speed NOUT. During deceleration of the vehicle, however, there is basically no need to shift up the transmission 18 as is apparent from the shift map as indicated in FIG. 7. Therefore, in this embodiment, upshifting is substantially inhibited by setting the duty ratio of the upshift solenoid valve 52 controlled by the shift control unit 100 to 0%, or by setting the feedback gain to "0", for example. As a result, fluctuations (hunting) of the speed ratio γ of the continuously variable transmission 18 due to increases and decreases in the output shaft rotational speed NOUT during the operation of the ABS 82 is reduced or suppressed.

During coasting of the vehicle with the accelerator operating amount $\theta_{ACC}$ being 0%, a fuel cut is performed by the engine ECU 108 so that fuel stops being supplied to the engine 12. In step S6 of FIG. 8, the fuel cut is immediately cancelled, and supply of fuel to the engine 12 is re-started so that the engine 12 can rotate by itself (i.e., the engine 12 is driven by use of the fuel). When the ABS is in operation, the vehicle is normally running in a coasting state, and a fuel cut is performed if the vehicle speed is equal to or higher than a predetermined speed. In step S7, the engine ECU 108 operates to increase the degree of opening of an idle speed control valve (ISC valve) to be greater than normal so that the idle speed established when the accelerator operating amount $\theta_{ACC}$ is 0% is increased to be greater than a normal value. As a result, the amount of oil delivered from the oil pump 28 is increased so as to suppress a reduction in the hydraulic pressure during a shifting operation. In this manner, it becomes possible to ensure a hydraulic pressure needed for securely clamping the transmission belt, without considerably reducing the rate of change in the speed ratio during downshifting in step S4. This makes it possible to achieve both good performance in providing a hydraulic pressure for securely gripping or clamping the belt, and good performance in returning the speed ratio γ to the vehicle-stop speed ratio before the vehicle stops. If the engine 12 is of the electronic throttle type, the opening of an electronic throttle valve may be controlled to be large so as to increase the idle speed.

In step S8, the belt clamping force controlled by the clamping force control unit 102, namely, the hydraulic pressure $P_O$ of the hydraulic cylinder of the output-side variable pulley 46, is increased by a predetermined rate or a predetermined value. This makes it possible to more reliably prevent the belt from slipping during shifting due to the inertia of the engine 12, the torque converter 14, etc.

Figure 10:
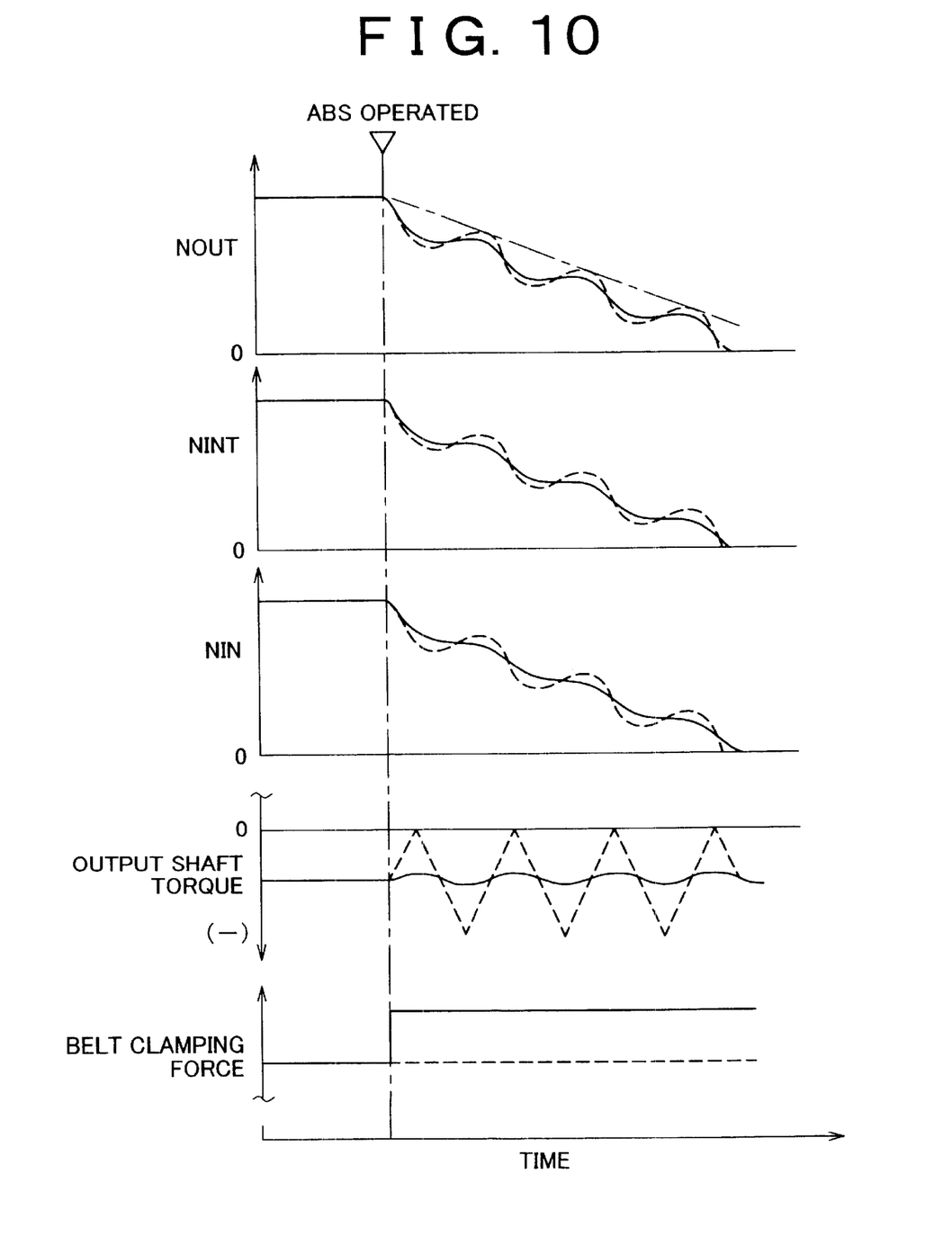
FIG. 10 is a time chart indicating changes of various parameters related to control of the continuously variable transmission during an operation of an anti-lock brake system (ABS).

In the time chart of FIG. 10, solid lines indicate tendencies of changes of various parameters occurring when the above-described correction control is performed by the ABS-related correcting unit 104, and broken lines indicate tendencies of changes of the parameters occurring when the correction control is not performed. Furthermore, a one-dot chain line in the graph related to the output-shaft speed NOUT represents the vehicle body speed.

According to this embodiment, when the ABS 82 is in operation, both the output-shaft rotational speed NOUT and the input shaft-rotational speed NIN are subjected to smoothing processes (e.g., a method of moving average) in steps S2 and S3 during the shift control of the continuously variable transmission 18 performed by the shift control unit 100. Therefore, fluctuations or variations in the speed ratio γ of the continuously variable transmission 18 due to increases and decreases in the output-shaft speed NOUT during the operation of the ABS 82 are suppressed or reduced, so that the vehicle is less likely to suffer from bumping (shift shocks) due to the changes in the speed ratio. Since the input-shaft speed NIN and the output-shaft speed NOUT are smoothed for the shift control, the control apparatus can be more easily constructed at a reduced cost, as compared with the case where shift control is performed based on an estimated vehicle body speed that is determined by the ABS 82, or the like.

Furthermore, during the operation of the ABS 82, upshift of the continuously variable transmission 18 by the shift control unit 100 is inhibited in step S5. Therefore, fluctuations in the speed ratio γ of the continuously variable transmission 18 due to increases and decreases in the output shaft rotational speed NOUT during the operation of the ABS 82 are reduced, so that the vehicle is less likely to suffer from bumping (shift shocks) due to the changes in the speed ratio. Still further, since the vehicle is being decelerated during the operation of the ABS 82, upshifting is basically unnecessary, and can be inhibited without causing any problem during the operation of the ABS 82.

Still further, during the operation of the ABS 82, the belt clamping force controlled by the clamping force control unit 102 is increased in step S8. This suitably prevents the transmission belt 48 from slipping which would be caused by the inertia torque of the engine 12, the torque converter 14, etc. due to increases and decreases in the output-shaft speed NOUT during the operation of the ABS 82, in particular, the inertia torque applied in the reverse direction by the drive wheels 24R, 24L that are rotated in accordance with the vehicle body speed when the braking force is reduced.

Furthermore, during the operation of the ABS 82, the continuously variable transmission 18 is rapidly or suddenly shifted down in accordance with a rapid deceleration of the vehicle. When hydraulic oil is drained from the input-side variable pulley 42 via the discharge passage 62 and the flow control valve 58 during downshifting, hydraulic oil is also drained from the line oil passage 64 that communicates with the supply passage 60 via the flow control valve 54 with a predetermined flow cross-sectional area, resulting in an increased amount of consumption of hydraulic oil. In the illustrated embodiment, however, the idle speed is increased so as to increase the amount of hydraulic oil delivered from the oil pump 28 in step S7, so that the transmission belt is prevented from slipping due to a reduction in the hydraulic pressure that would be caused by shortage of the hydraulic oil supplied. In this embodiment, in particular, the amount of hydraulic oil delivered from the oil pump 28 can be increased simply by increasing the idle speed of the engine 12 without requiring complicated control.

Furthermore, during the operation of the ABS 82, the rate of change in the speed ratio during downshifting is reduced in step S4. Therefore, fluctuations in the speed ratio γ of the continuously variable transmission 18 due to increases and decreases in the output shaft rotational speed NOUT during the operation of the ABS 82 are reduced, so that the vehicle is less likely to suffer from bumping (shift shocks) due to the changes in the speed ratio. Furthermore, since the amount of hydraulic oil consumed for a shift action is reduced, belt slippage due to shortage of the hydraulic oil is suitably prevented. Since the amount of hydraulic oil delivered from the oil pump 28 is increased according to the illustrated embodiment, there is no need to greatly restrict the rate of change in the speed ratio during downshifting in order to avoid hydraulic oil shortage. Hence, the hydraulic oil shortage can be avoided without affecting the performance in returning the belt to the position corresponding to the predetermined vehicle-stop speed ratio before the vehicle stops.

When the shift position is the N range in which the power transmission path is disconnected, the inertia on the input side is small, and almost no shift shock and no belt slippage will occur even if the transmission is shifted down at a normal rate. In the illustrated embodiment, when the N range is selected, the transmission is shifted down at a normal rate of change in the speed ratio without substantially restricting the rate of change in the speed ratio, so that the speed ratio γ of the continuously variable transmission 18 can be promptly returned to the vehicle-stop speed ratio.

In the illustrated embodiment, it is determined whether the power transmission path is connected (the D range or the R range) or disconnected (the N range) only in the process of step S4 for restricting the rate of change in the speed ratio during downshifting in step S4, and the rate of change in the speed ratio is restricted only when the power transmission path is connected. However, the invention is not limited to this embodiment. Namely, while the power transmission path is being disconnected, the inertia of the engine 12, the torque converter 14, or the like, does not affect a shifting action, and therefore shift shock or belt slippage is unlikely to occur due to the inertia. According to the invention, therefore, all of steps S2 to S8 other than step S4 may be modified such that each step includes a sub-step of determining whether the power transmission path is connected (the D range or the R range) or is disconnected (the N range), and such that the control of each step is performed only when the power transmission path is connected.

As in the illustrated embodiment, the invention is applicable to a continuously variable transmission of a belt-and-pulley type including (a) an input-side variable pulley and an output-side variable pulley whose respective effective diameters are variable, and (b) a transmission belt that is wound around the variable pulleys to effect power transmission by using frictional force. The invention, however, is equally applicable to other types of continuously variable transmissions, such as a toroidal type continuously variable transmission. Preferably, the control of frictional force, such as belt clamping force, and the control of the speed ratio of the transmission are performed by hydraulically controlling a hydraulic cylinder or cylinders.

The power source for driving the vehicle may be selected from various power sources, including internal combustion engines, such as gasoline engines and diesel engines, that operate through combustion of fuel, and electric motors that operate with electric energy. The power source may include both an internal combustion engine and an electric motor.

The shift control device for controlling the speed ratio of the continuously variable transmission may operate in various manners. For example, the shift control device determines a target speed ratio based on a shift condition, and controls the transmission so that an actual speed ratio becomes equal to the target speed ratio. In another example, the shift control device determines a target input-side rotation speed based on a vehicle speed, an output-side rotation speed, etc., and controls the transmission in a feedback fashion so that an actual input-side rotation speed becomes equal to the target input-side rotation speed. Since the target input-side rotation speed corresponds to the target speed ratio, it is not always necessary to obtain or determine the target speed ratio itself.

The aforementioned shift condition is set or established in the form of an arithmetic expression, a map or the like, which uses, as parameters, various driving states such as an output requirement (e.g., an accelerator operating amount) made by a vehicle driver, and a vehicle speed (corresponding to an output-shaft rotation speed). It is not necessary to automatically control the speed ratio. In other words, the speed ratio may be changed as desired through a manual operation performed by the driver or vehicle operator, under a certain condition, for example, that the vehicle is running at or above a predetermined vehicle speed.

The anti-lock brake system of the illustrated embodiment is constructed to control a braking oil pressure so as to prevent a wheel from locking when a braking member, such as a brake pedal, is operated and a braking force in the form of a hydraulic pressure is applied from a wheel cylinder to the wheel. However, the anti-lock brake system is not limited to this type, but may be selected from various other types, such as an anti-lock brake system that uses a generator for producing a braking force.

According to the present invention, at least one of the input-shaft rotational speed and the output-shaft rotational speed for use in the control of the speed ratio is/are subjected to the smoothing process. For example, when a target input-shaft rotational speed is calculated based on an actual output-shaft rotational speed according to predetermined shift conditions (such as a map), and feedback control is performed so that an actual input-shaft rotational speed becomes equal to the target rotational speed, the speed ratio is controlled depending upon both the input-shaft rotational speed and the output-shaft rotational speed, and therefore both of the input-shaft and output-shaft speeds may be smoothed. Although both of the input-shaft and output-shaft rotational speeds may be subjected to smoothing processes, it is preferable to smooth the output-shaft rotational speed that is actually varied (i.e., increased and decreased) by the anti-lock brake system. The smoothing process may be performed by calculating a moving average of the input-shaft or output-shaft speed over a fixed or predetermined interval of time or over a fixed number of samples.

According to the invention, an upshift of the continuously variable transmission is restricted during an operation of an anti-lock brake system. While an upshift of the transmission may be completely inhibited, it is also possible to merely provide an upper guard or upper limit to an upshift width (i.e., an amount of change in the speed ratio) or to a rate of change in the speed ratio.

In the shift control device of the invention in which the speed ratio of the transmission is controlled by changing a groove width of, for example, the input-side variable pulley, hydraulic oil is drained from the input-side variable pulley so as to increase the groove width of this pulley during a downshift, but this operation itself does not result in a significant increase in the amount of consumption of the hydraulic fluid. In the case where the hydraulic oil is supplied to and discharged from the input-side variable pulley through different paths (i.e., a supply path and a discharge path) during an upshift and a downshift, respectively, and a certain amount of hydraulic oils is constantly supplied to the supply path so as to avoid changes in the speed ratio due to oil leakage, the hydraulic oil is drained from the supply path as well as the variable pulley during a downshift, resulting in an increase in the amount of consumption of the hydraulic oil during the downshift. The invention is favorable applicable to the CVT having this type of shift control device. Namely, the amount of hydraulic oil from an oil pump is preferably increased according to the invention when the vehicle is rapidly decelerated and the amount of consumption of the hydraulic oil is increased in a downshift operation.

While the oil pump consists of a mechanically-operated pump that is driven and rotated by the internal combustion engine in the illustrated embodiment, it is possible to employ an electrically-operated oil pump that is controlled independently of the operation of the power source for running the vehicle. In this case, the amount of hydraulic oil delivered from the pump is controlled to at least sufficient amount so as to save the amount of consumption of electric energy.

The problem of the shortage of the hydraulic oil upon rapid deceleration as described above does not occur when the oil pump rotates at a high speed and delivers a sufficiently large amount of hydraulic oil. Accordingly, the amount of the hydraulic oil delivered from the oil pump may be increased under a certain condition, for example, only when the speed of rotation of the oil pump (which is equal to that of the engine in the illustrated embodiment) is equal to or lower than a predetermined value.

The belt clamping force or pressure may be controlled based on clamping force control conditions (in the form of a map or an arithmetic operation, for example), using, as parameters, an output requirement by a driver, such as an accelerator operating amount (corresponding to transferred torque), and various vehicle operating states, such as the engine output and the speed ratio.

While the amount of hydraulic oil delivered from the oil pump is increased during an operation of an anti-lock brake system in the illustrated embodiment, the amount of delivered hydraulic oil may also be increased in other situations in which the transmission belt may slip due to shortage of the hydraulic oil. For example, the amount of hydraulic oil delivered from the oil pump may be increased when a certain physical quantity relating to braking force, more specifically, a force applied to a brake pedal (which represents a desired braking force) or a hydraulic pressure applied to a brake system, exceeds a predetermined value during a rapid deceleration of the vehicle.

In order to restrict the rate of change in the speed ratio of the continuously variable transmission during the operation of the anti-lock brake system, a predetermined guard (limit value) may be provided to put a certain limit to the duty ratio of the solenoid valve for controlling the flow rate of the hydraulic oil during a shift operation. In this case, the limit value is determined so that the speed ratio can be returned to a vehicle-stop speed ratio (which is normally the maximum speed ratio) by the time the vehicle stops. Also, the limit value may be changed depending upon an operating condition, such as an input-shaft rotational speed, as a parameter. Namely, the rate of change in the speed ratio may be restricted only by a small degree when the input-shaft rotational speed is high, since no problem resides in the amount of consumption of hydraulic oil from the oil pump.

According to the invention, the rate of change in the speed ratio of the continuously variable transmission may be restricted by a smaller degree when power transmission between the power source and the drive wheels is cut off, as compared with when power transmission is transmitted between the power source and the drive wheels. In this connection, the power transmission may be cut off between the power source and the continuously variable transmission, or may be cut off between the continuously variable transmission and the drive wheels. Also, the above-indicated smaller degree encompasses the case where no restriction is put on the rate of change in the speed ratio of the transmission, namely, the case where the speed ratio of the transmission is normally controlled.

In the illustrated embodiment, the controller 80 (shown in FIG. 2) is implemented as a microcomputer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An apparatus for controlling a continuously variable transmission of a motor vehicle that is provided in a power transmission path between a power source that runs the vehicle and at least one drive wheel, wherein a speed ratio of the transmission can be continuously varied, and wherein the speed ratio is defined as a ratio of a rotational speed of an input shaft on a side of the power source to a rotational speed of an output shaft on a side of the at least one drive wheel, the apparatus comprises:

a controller that:
controls the speed ratio of the continuously variable transmission in accordance with a predetermined shift condition; and
smoothes at least one of the rotational speed of the input shaft and the rotational speed of the output shaft for use in control of the speed ratio by the controller, during an operation of an anti-lock brake system that controls a braking force to prevent the at least one drive wheel from locking during a braking operation.

2. The apparatus according to claim 1, wherein the controller restricts an upshift of the continuously variable transmission during the operation of the anti-lock brake system.

3. The apparatus according to claim 1, wherein:
the continuously variable transmission is a belt-and-pulley type and comprises a pair of pulleys and a transmission belt that is wound around the pulleys, and the transmission belt transmits power between the power source and the at least one drive wheel by using a frictional force;
the controller controls a belt clamping force by hydraulically operating at least one of the pulleys to clamp the transmission belt; and
the controller increases the belt clamping force during the operation of the anti-lock brake system.

4. The apparatus according to claim 1, wherein the controller reduces a rate of change in the speed ratio of the transmission by restricting a shift speed during the operation of the anti-lock brake system.

5. The apparatus according to claim 4, wherein the rate of change in the speed ratio of the continuously variable transmission is restricted by a smaller degree when power transmission between the power source and the at least one drive wheel is cut off, as compare d with when power transmission is transmitted between the power source and the at least one drive wheel.

6. The apparatus according to claim 1, wherein:
the continuously variable transmission is of a belt-and-pulley type and comprises a pair of pulleys and a transmission belt that is wound around the pulleys, and the transmission belt transmits power between the power source and the at least one drive wheel by using a frictional force; and
the controller:
controls the speed ratio of the continuously variable transmission by hydraulically changing a groove width of each of the pulleys,
controls a belt clamping force by hydraulically operating at least one of the pulleys to clamp the transmission belt; and
increases an amount of a hydraulic oil delivered from an oil pump when the vehicle is rapidly decelerated, and wherein the oil pump generates a hydraulic pressure for controlling the speed ratio of the continuously variable transmission and the belt clamping force.

7. The apparatus according to claim 6, wherein:
the power source comprises an internal combustion engine that generates a driving force by utilizing combustion of a fuel;
the oil pump comprises a mechanically-operated pump that is driven and rotated by the internal combustion engine; and
the controller increases the amount of the hydraulic oil delivered from the oil pump by increasing an idle speed of the internal combustion engine.

8. The apparatus according to claim 6, wherein the controller increases the amount of the hydraulic oil delivered from the oil pump when the vehicle is rapidly decelerated and the anti-lock brake system is in operation.

9. The apparatus according to claim 2, wherein:
the continuously variable transmission is of a belt-and-pulley type and comprises a pair of pulleys and a transmission belt that is wound around the pulleys, and the transmission belt transmits power between the power source and the at least one drive wheel by using a frictional force; and
the controller:
controls the speed ratio of the continuously variable transmission by hydraulically changing a groove width of each of the pulleys,
controls a belt clamping force by hydraulically operating at least one of the pulleys to clamp the transmission belt; and
increases an amount of a hydraulic oil delivered from an oil pump when the vehicle is rapidly decelerated, and wherein the oil pump generates a hydraulic pressure for controlling the speed ratio of the continuously variable transmission and the belt clamping force.

10. The apparatus according to claim 2, wherein:
the continuously variable transmission is a belt-and-pulley type and comprises a pair of pulleys and a transmission belt that is wound around the pulleys, and the transmission belt transmits power between the power source and the at least one drive wheel by using a frictional force; and
the controller controls a belt clamping force by hydraulically operating at least one of the pulleys to clamp the transmission belt; and the controller increases the belt clamping force during the operation of the anti-lock brake system.

11. The apparatus according to claim 2, wherein the controller reduces a rate of change in the speed ratio of the continuously variable transmission by restricting a shift speed during the operation of the anti-lock brake system.

12. The apparatus according to claim 3, wherein the controller reduces a rate of change in the speed ratio of the continuously variable transmission by restricting a shift speed during the operation of the anti-lock brake system.

13. The apparatus according to claim 6, wherein the controller increases the belt clamping force during the operation of the anti-lock brake system.

14. The apparatus according to claim 6, wherein the controller reduces a rate of change in the speed ratio of the continuously variable transmission by restricting a shift speed during the operation of the anti-lock brake system.

15. The apparatus according to claim 9, wherein the controller increases the belt clamping force during the operation of the anti-lock brake system.

16. The apparatus according to claim 9, wherein the controller reduces a rate of change in the speed ratio of the transmission by restricting a shift speed during the operation of the anti-lock brake system.

17. An apparatus for controlling a continuously variable transmission of a motor vehicle that is provided in a power transmission path between a power source that runs the vehicle and at least one drive wheel, wherein a speed ratio of the transmission can be continuously varied, and wherein the speed ratio is defined as a ratio of a rotational speed of an input shaft on a side of the power source to a rotational speed of an output shaft on a side of the at least one drive wheel, the apparatus comprises:
a controller that:
controls the speed ratio of the continuously variable transmission in accordance with a predetermined shift condition; and
restricts an upshift of the continuously variable transmission, during an operation of an anti-lock brake system that controls a braking force to prevent the at least one drive wheel from locking during a braking operation.

18. An apparatus for controlling a continuously variable transmission of a motor vehicle that is provided in a power transmission path between a power source that runs the vehicle and at least one drive wheel, wherein a speed ratio of the continuously variable transmission can be continuously varied, and wherein the speed ratio is defined as a ratio of a rotational speed of an input shaft on a side of the power source to a rotational speed of an output shaft on a side of the at least one drive wheel, the continuously variable transmission comprises a pair of pulleys and a transmission belt that is wound around the pulleys, the transmission belt transmits power between the power source and the at least one drive wheel by using a frictional force, the apparatus comprises:
a controller that:
controls the speed ratio of the transmission by hydraulically changing a groove width of each of the pulleys;
controls a belt clamping force by hydraulically operating at least one of the pulleys to clamp the transmission belt; and
increases an amount of a hydraulic oil delivered from an oil pump when the vehicle is rapidly decelerated and wherein the oil pump generates a hydraulic pressure to control the speed ratio of the transmission and to control the belt clamping force.

19. The apparatus according to claim 18, wherein the controller increases the amount of the hydraulic oil delivered to the oil pump when an anti-lock brake system is in operation.

20. The apparatus according to claim 18, wherein:
the power source comprises an internal combustion engine that generates a driving force by utilizing combustion of a fuel;
the oil pump comprises a mechanically-operated pump that is driven and rotated by the internal combustion engine; and
the controller increases the amount of the hydraulic oil delivered from the oil pump by increasing an idle speed of the internal combustion engine.

21. The apparatus according to claim 20, wherein the controller increases the amount of the hydraulic oil delivered to the oil pump when an anti-lock brake system is in operation.

22. A method for controlling a continuously variable transmission of a motor vehicle that is provided in a power transmission path between a power source that runs the vehicle and at least one drive wheel, wherein a speed ratio of the transmission can be continuously varied, and wherein the speed ratio is defined as a ratio of a rotational speed of an input shaft on a side of the power source to a rotational speed of an output shaft on a side of the at least one drive wheel, the method comprises:
controlling the speed ratio of the continuously variable transmission in accordance with a predetermined shift condition; and
smoothing at least one of the rotational speed of the input shaft and the rotational speed of the output shaft for use in control of the speed ratio by the controller, during an operation of an anti-lock brake system that controls a braking force to prevent the at least one drive wheel from locking during a braking operation.

23. The method according to claim 22, wherein the continuously variable transmission is a belt-and-pulley type and comprises a pair of pulleys and a transmission belt that is wound around the pulleys, and the transmission belt transmits power between the power source and the at least one drive wheel by using a frictional force, and wherein the method further comprises:
controlling a belt clamping force by hydraulically operating at least one of the pulleys to clamp the transmission belt; and
increasing the belt clamping force during the operation of the anti-lock brake system.

24. A method for controlling a continuously variable transmission of a motor vehicle that is provided in a power transmission path between a power source that runs the vehicle and at least one drive wheel, wherein a speed ratio of the transmission can be continuously varied, and wherein the speed ratio is defined as a ratio of a rotational speed of an input shaft on a side of the power source to a rotational speed of an output shaft on a side of the at least one drive wheel, the method apparatus comprises:
controlling the speed ratio of the continuously variable transmission in accordance with a predetermined shift condition; and
restricting an upshift of the continuously variable transmission, during an operation of an anti-lock brake system that controls a braking force to prevent the at least one drive wheel from locking during a braking operation.

25. A method for controlling a continuously variable transmission of a motor vehicle that is provided in a power transmission path between a power source that runs the vehicle and at least one drive wheel, wherein a speed ratio of the continuously variable transmission can be continuously varied, and wherein the speed ratio is defined as a ratio of a rotational speed of an input shaft on a side of the power source to a rotational speed of an output shaft on a side of the at least one drive wheel, the continuously variable transmission comprises a pair of pulleys and a transmission belt that is wound around the pulleys, the transmission belt transmits power between the power source and the at least one drive wheel by using a frictional force, the method comprises:
controlling the speed ratio of the transmission by hydraulically changing a groove width of each of the pulleys;
controlling a belt clamping force by hydraulically operating at least one of the pulleys to clamp the transmission belt; and
increasing an amount of a hydraulic oil delivered from an oil pump when the vehicle is rapidly decelerated and wherein the oil pump generates a hydraulic pressure to control the speed ratio of the transmission and to control the belt clamping force.

26. The method according to claim 25, wherein:
the power source comprises an internal combustion engine that generates a driving force by utilizing combustion of a fuel;
the oil pump comprises a mechanically-operated pump that is driven and rotated by the internal combustion engine; and
the method further comprises:
increasing the amount of the hydraulic oil delivered from the oil pump by increasing an idle speed of the internal combustion engine.

27. The method according to claim 26, wherein the amount of the hydraulic oil delivered to the oil pump is increased when an anti-lock brake system is in operation.

* * * * *